United States Patent [19]

Ochi et al.

[11] Patent Number: 5,771,085
[45] Date of Patent: Jun. 23, 1998

[54] LCD DEVICE WITH AN ALIGNMENT MARK HAVING SAME MATERIAL AS MICROLENSES

[75] Inventors: Tetsuro Ochi; Shizuo Nishihara; Hiroaki Ichikawa; Satofumi Koike; Yasunori Sato, all of Kanagawa, Japan

[73] Assignee: Sony Corporation, Japan

[21] Appl. No.: 740,903

[22] Filed: Nov. 4, 1996

[30]      Foreign Application Priority Data

Nov. 6, 1995   [JP]   Japan .................................... 7-287316
  Sep. 20, 1996  [JP]   Japan .................................... 8-250649

[51] Int. Cl.[6] .......................... G02F 1/335; G02F 1/1333
[52] U.S. Cl. ............................................ 349/158; 349/95
[58] Field of Search ............................ 349/95, 158, 110

[56]                   References Cited

U.S. PATENT DOCUMENTS 5,164,853  11/1992  Shimazaki ............................. 349/158
  5,278,685   1/1994  Iwamoto et al. ....................... 349/158
  5,349,453   9/1994  Munakata ................................ 349/95
  5,629,787   5/1997  Tusbota et al. ....................... 349/158
  5,691,794  11/1997  Hoshi et al. .......................... 349/158

*Primary Examiner*—William L. Sikes
*Assistant Examiner*—Toan Ton
*Attorney, Agent, or Firm*—Ronald P. Kananen

[57]                      ABSTRACT

To provide a liquid crystal display device and manufacturing method thereof for preventing a drop in the pixel slot opening and focus rates due to poor alignment precision of the drive substrate and microlens which face each other, and for improving the focus rate and production efficiency. A lens group comprised of a plurality of microlenses is integrated into the opposing substrate. A second alignment mark is formed at the desired position within the display area on the opposing substrate. This second alignment mark is formed along grooves between numerous protrusions having a semi-circular shaped cross section so the outer contours of the face form a cross shape of a specific width. These protrusions are made of the same material (for instance transparent plastic) and shape (semi-circular cross section) as those of the microlens at the display area, forming a lens shape. The second alignment mark is made together and simultaneously with the forming of the microlens in such a way that there is no deviation between the second alignment mark and the microlens opposite it.

11 Claims, 13 Drawing Sheets

F I G. 6
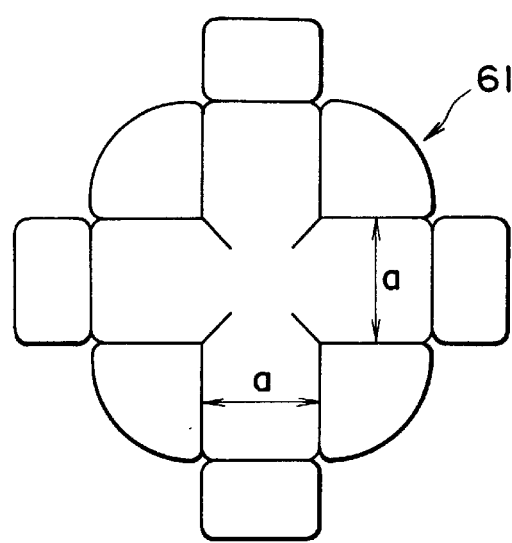
F I G. 7A
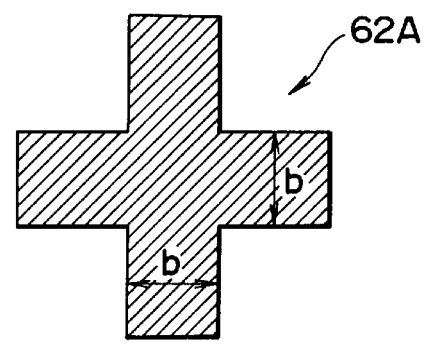
F I G. 7B
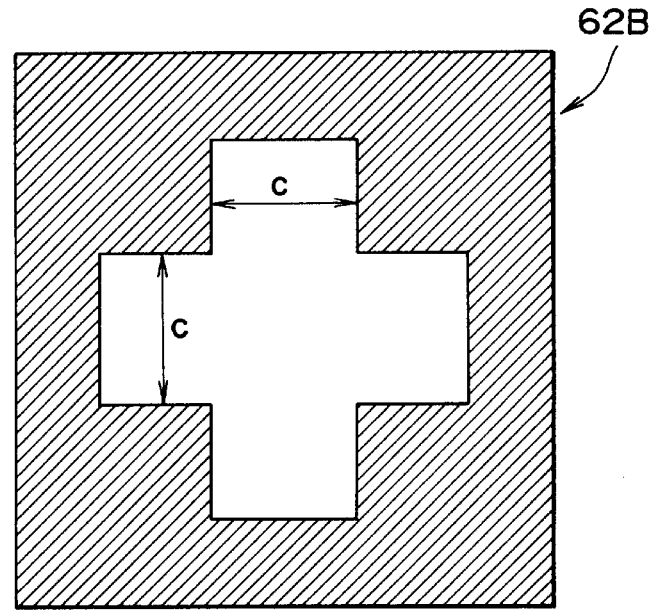

d < e e > f

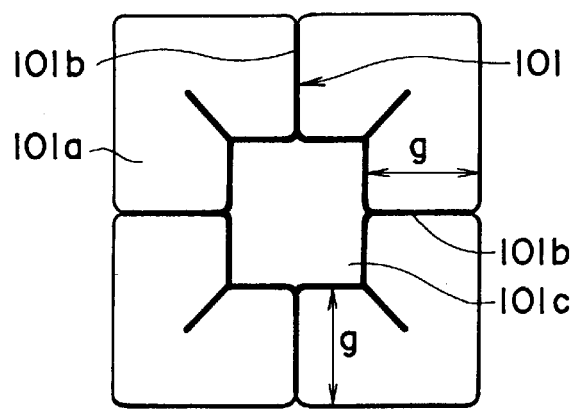
F I G. 13A
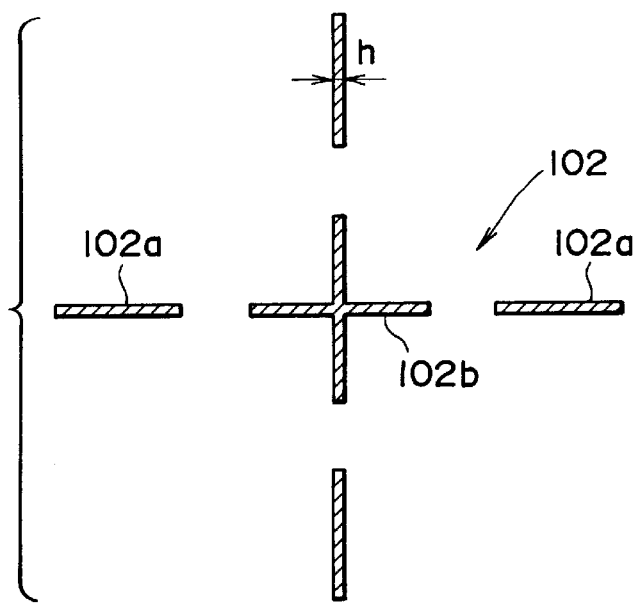
F I G. 13B
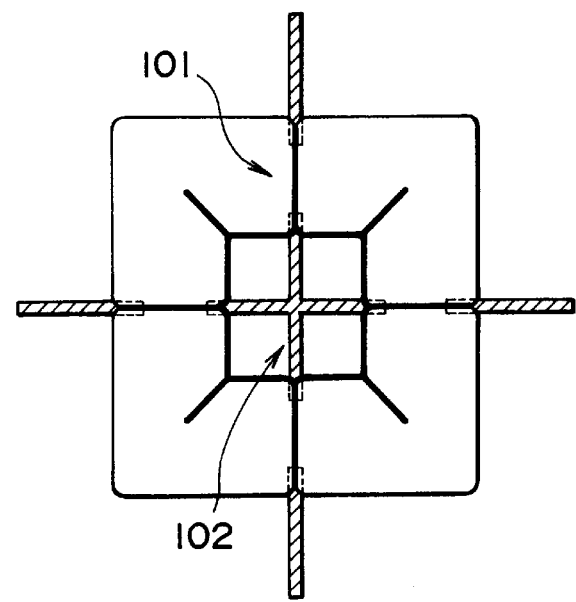
F I G. 13C

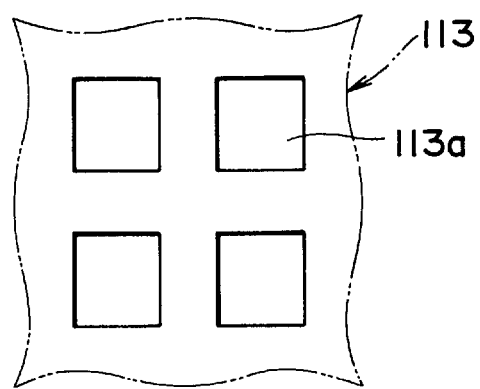
FIG. 17A
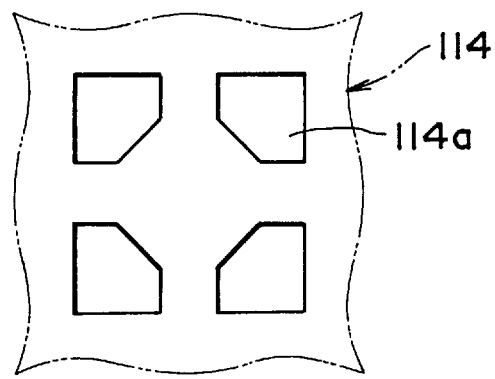
FIG. 17B
FIG. 18
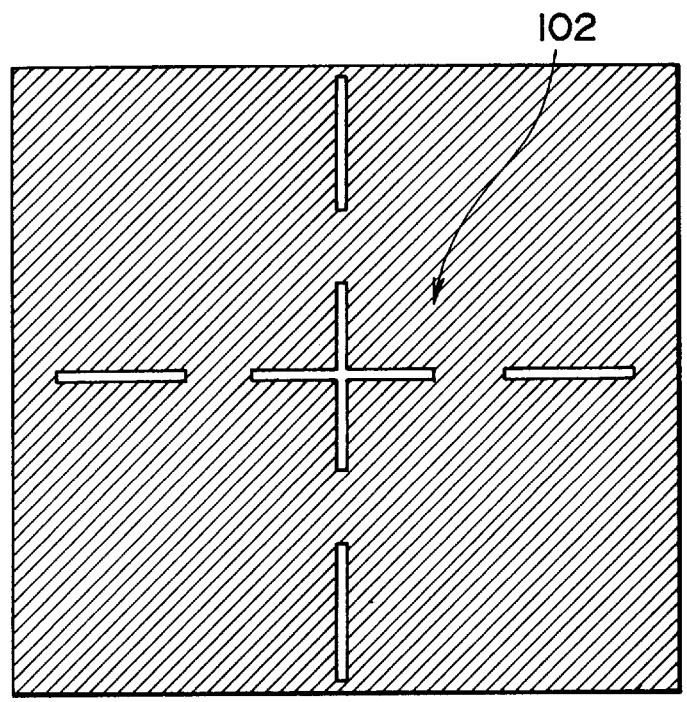

LCD DEVICE WITH AN ALIGNMENT MARK HAVING SAME MATERIAL AS MICROLENSES

BACKGROUND OF THE INVENTION

1. Field of the Invention

This invention relates to liquid crystal display devices and a manufacturing method for them, as used for instance in VTRs (video tape recorders) housed in camera bodies and liquid crystal projectors etc. More particularly, this invention relates to an improved fine alignment method for the process in which two similar substrates of a liquid crystal display device are made to overlap (or position-aligned).

2. Description of Related Art

In recent years, use of electronic equipment with liquid crystal display devices typified by devices such as liquid crystal projectors has become widespread and demands are being made to add more functions to liquid crystal display devices. This demand has in turn led to more progress in producing more complex liquid crystal display devices that also have higher brightness. These kind of liquid crystal display devices are normally made from thin film transistors with pixel control (hereafter the thin film transistor is referred to as a "TFT"), or are made from substrates formed from storage capacitance (hereafter "drive substrates") or are made from substrates formed of graphic matrices (hereafter "opposing substrates").

The drive substrates for these liquid crystal display devices are comprised of the above mentioned TFTs and an slit for beaming an image. The transmittance factor sometimes cannot be maintained however, due to the space they take up in the TFT. A pixel micro focusing lens (hereafter simply referred to as "microlens") is therefore provided at pixel openings in the conventional art. Essentially, this microlens is utilized to focus light on the slit for light being beamed onto the TFT. The conventionally known method for manufacturing the microlens involves custom fabrication of a microlens array and an alignment method for the opposing substrates.

In this kind of liquid crystal display device, the drive substrate and the opposing substrate are aligned after first having been overlapped (or position-aligned) by an overlap device using the alignment mark as a reference. The overlap method for the drive substrate and opposing substrate will next be further explained while referring to FIG. 19.

FIG. 5 shows a top view of the drive substrate 2 and opposing substrate 3 while in the overlapped state in the display device 1. In the overlap device as shown in FIG. 20, a substrate (for instance the drive substrate 2) is placed on an X-Y-θ table 11 along with another substrate (for instance the opposing substrate 2) placed in an opposing position facing the first substrate. A microscope 12 is used observe these substrates from above while the substrate 2 is moved on the X-Y-θ table 11 so that the alignment marks 7 and 8 for the substrates 2 and 3 match their complementary positions.

This liquid crystal display device 1 is largely comprised of a display area 4 for showing the image, a guard ring 5 such as of sensitive aluminum film on the periphery of this display area 4, and an external IC or integrated circuit (not shown in the drawing) for input of essential information from an externally connected pad 6. The alignment marks 7 and 8 (positioning marks) are formed at the desired positions on the guard ring 5. The alignment mark 7 is formed on the drive board 2, and the alignment mark 8 is formed on the opposing substrate 8. This figure (FIG. 19) shows the drive substrate 2 and the opposing substrate 2 overlapped on one another. A plurality of microlenses 10 are fastened on the opposing substrate 3 for focusing light on the drive substrate 2 (without TFT) through the slit 9.

The drive substrate 2 and the opposing substrate 3 are overlapped on each other based on the alignment mark 7 and the alignment mark 8. Here, an optimal overlap state of the slit 9 and the microlens array 10 is essential to maintain an adequate transmittance factor. Once overlap is complete, besides sealing and setting the seal material (not shown in drawing) in place between the edges of the drive substrate 2 and the opposing substrate 3, the liquid crystal constituents are supported in the gap between the drive substrate 2 and the opposing substrate 3. The liquid crystal display device 1 can now be fabricated by integrating light polarizing substrates in layers on both sides of these substrates 2 and 3.

However in the liquid crystal display device described above, the alignment mark must be formed simultaneously when forming the color filter and black matrix onto the opposing substrate, and typically alignment with the drive substrate performed by utilizing this alignment mark. Consequently, when installing the microlens on the opposing substrate, a "deviation" occurs between the microlens and pixel section, creating the problem of a drop in the focus rate. Also, in display devices where the microlens array is custom-made and then attached to the opposing substrate, not only are positioning alignment marks required for the microlens and the color filter (or black matrix) of the opposing substrate, but the problem of a similar type "deviation" in the microlens occurs causing a drop in the focus rate.

Further, for instance when fabricating a black matrix on the drive substrate, suitable for use with a liquid crystal projector the opposing substrate may have only a microlens installed on it. Positioning alignment techniques conventionally employed for such cases are; forming another alignment mark as needed on the opposing substrate (method 1), or beaming a ray of light onto the microlens and matching the focused spot of light with the pixels to obtain maximum light transmittance (method 2).

However the above method 1 requires a new alignment mark be formed on the opposing substrate, not only creating additional production costs but also causing a drop in production efficiency due to the increased lead time. In the event a "deviation" occurs between the microlens and its matching position when forming the alignment mark, the further drawback occurs of enlargement of the "deviation" between slot and microlens, resulting in a drop in focus efficiency. Next, in the above method 2 it is necessary to prepare a light source for use in optical alignment and then attach the drive substrate and the opposing substrate at the correct positions. Method 2 therefore, not only requires large and complicated equipment but also creates additional expenses along with a drop in production efficiency. For instance in cases where the light is beamed while tilted several degrees aligned with the rubbing direction and not from the normal direction, the Kohler optic system must be used rather than the telecentric optic system so that a corresponding light source must be prepared accompanied by the need for larger equipment.

SUMMARY OF THE INVENTION

In view of the above problems, it is an object of the present invention to provide a liquid crystal display device and manufacturing method for preventing a drop in the pixel slot opening and focus rates due to poor precision in the position alignment between the drive substrate and the opposing substrate mounted with the microlens, as well as prevent a drop in production efficiency due to complicated equipment when beaming a light ray on the microlenses and thus also obtain an improvement in focus rate and production efficiency.

The liquid crystal display device of this invention comprises a first substrate having a pixel section made of numerous pixels and formed with a first alignment mark serving as an overlap reference, and a second substrate placed at a specified gap facing the first substrate and having a lens array comprised of numerous focusing lenses to match the pixels on the first substrate, and this second substrate is provided with a second alignment mark made of the same material as the microlens array and serving as an overlap reference.

The production method for the liquid crystal display device of this invention comprises a process for forming a first alignment mark for use as an overlap reference when aligned with the first substrate which has a pixel section made from numerous pixels and, a process for forming a second alignment mark on the second substrate for use as an overlap reference with the first substrate and made of the same material as the microlens array having numerous focusing lenses for matching the pixels on the first substrate, and a process in which after the first alignment mark is formed for the first substrate and the second alignment mark is formed for the second substrate, the first substrate and the second substrate are made to face each other across a specified gap and by using the first alignment mark and the second alignment mark as a reference, the first substrate and the second substrate are moved so that these two substrates overlap each other.

In the liquid crystal display device of this invention and its manufacturing method, a first alignment mark is formed as a reference for overlap alignment of the first substrate having the pixel section, and a lens array comprising numerous microlenses is formed on the second substrate corresponding to the pixel section on the first substrate, simultaneous with forming of the second alignment mark on the second substrate. These two substrates are then overlap aligned by using the first and the second alignment marks as a reference so that along with coordination of the pixel section with the microlenses, the pixel slit opening rate and the lens focus rates are improved.

In the liquid crystal display device and manufacturing method of this invention described above, by forming the first alignment mark used as the reference for overlap alignment of the first substrate containing the pixel section; and by simultaneously forming on the second substrate, the lens array comprised of a plurality of micro focus lenses corresponding to the pixel section on the first substrate; and by forming the second alignment mark made of the same transparent material as the lens array and used as a reference for overlap alignment; and by performing overlap alignment of the two substrates using the first alignment mark and the No. alignment mark as references so that the accuracy of substrate overlap alignment is improved, the pixel section and microlens are made to match with each other, and the pixel slot opening and focus rates are improved.

Also, in the manufacturing method for the liquid crystal display device of this invention, the second alignment mark of the second substrate is made of the same material and formed in the same process used for forming the microlens, so not only is overlap alignment accuracy improved but there is no need for adding a further manufacturing process thus allowing a reduction in manufacturing costs. This invention therefore enables manufacture at a low cost and in large quantities, of liquid crystal display devices with a bright display and good light transmittance.

BRIEF DESCRIPTION OF THE DRAWINGS

FIG. 5A is an upper view of the mask pattern corresponding to the second alignment mark shown in FIG. 3. FIG. 5B is an upper view of the mask pattern corresponding to the second alignment mark shown in FIG. 4.

FIG. 6 is an upper view of a sample structure of the second alignment mark and illustrates problems when variations occur in the contour of the protrusion comprising the second alignment mark.

FIGS. 7A and 7B are upper views showing the structure of the first alignment mark corresponding to the second alignment mark, when the size of the second alignment mark varies.

FIGS. 13A to 13C show various configurations of the embodiments of this invention. FIG. 13A is an upper view of the second alignment mark on the opposing substrate. FIG. 13B is an upper view of the first alignment mark of the drive substrate. FIG. 13C is an upper view showing these two alignment marks in their overlap aligned state.

FIGS. 17A/17B is two views illustrating the method for forming the second alignment mark of the configuration in the embodiment shown in FIGS. 13A to 13C. FIG. 17A is an upper view of the mask pattern corresponding to the second alignment mark shown in FIG. 15. FIG. 17B is an upper view of the mask pattern corresponding to the second alignment mark shown in FIG. 16.

FIG. 18 is an upper view of a variation of the first alignment mark in the configuration of the embodiment in FIGS. 13A to 13C.

DETAILED DESCRIPTION OF THE PREFERRED EMBODIMENTS

Figure 1A:
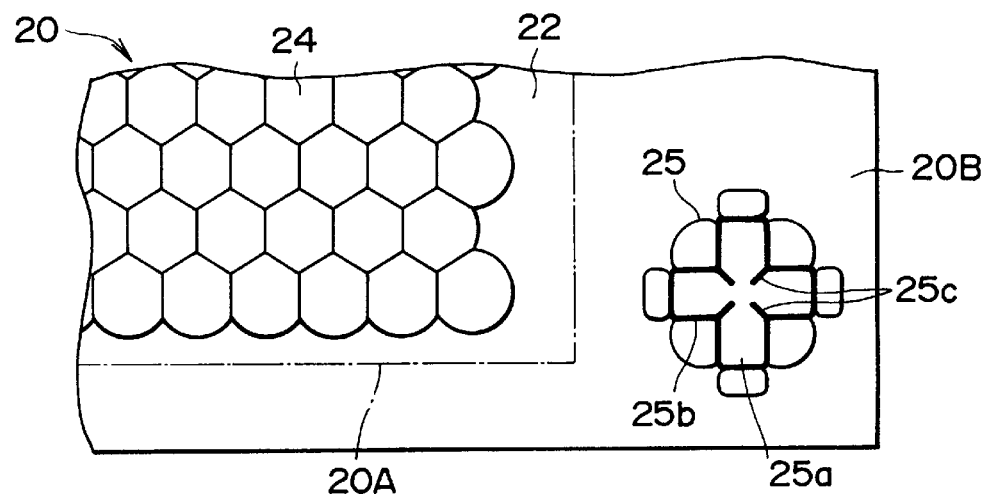
FIG. 1A is an upper view showing the opposing substrate of the liquid crystal display device of one embodiment of the invention.
Figure 1B:
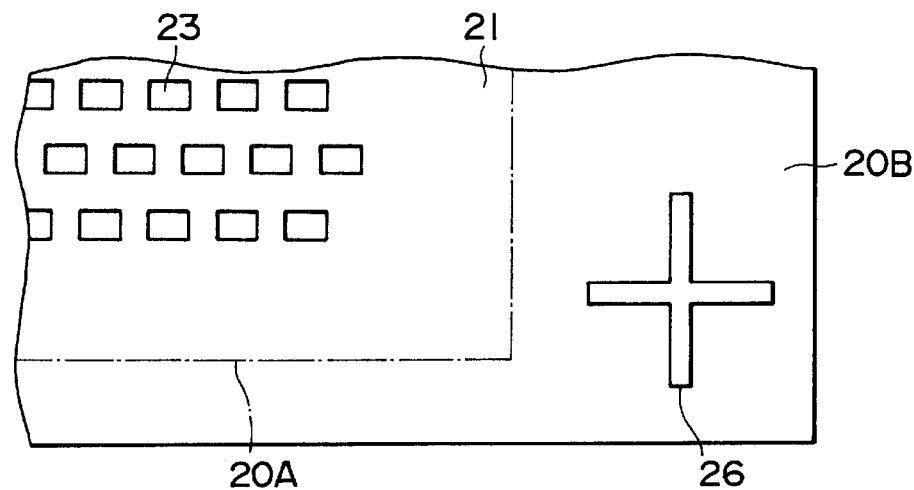
FIG. 1B is a top view showing the drive substrate and FIG. 1C is a side view showing the opposing substrate and the drive substrate in an overlapped and aligned state in the liquid crystal display device of one embodiment of the invention.
Figure 1C:
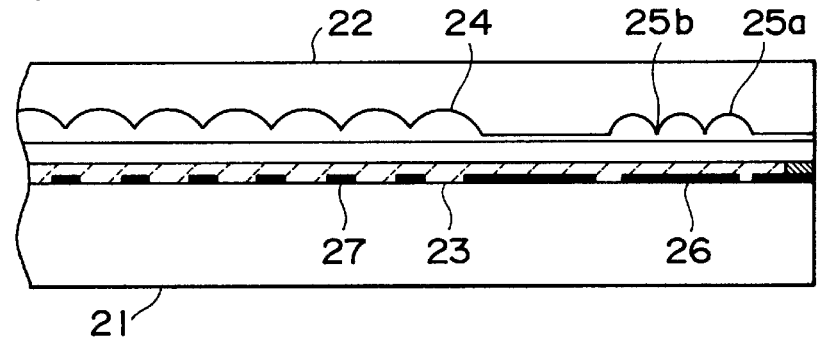

The embodiments of this invention will be explained while referring to the drawings.
First Embodiment The structure of the liquid crystal display device 20 of the first embodiment of this invention is shown in FIGS. 1A through 1C. These figures show a portion of the display area 20A and the non-display area (guard ring) 20B established at the periphery of the display area 20. The display device 20 is largely comprised of a first substrate which is the drive substrate 21 formed with TFTs for pixel control, and a second substrate which is an opposing substrate 22 formed with microlenses etc. A view as seen from above, of the opposing substrate 22 and the drive substrate 21 are shown respectively in FIGS. 1A and 1B. A view liquid crystal display device 20 as seen from the side after overlapping of the drive substrate 21 and the opposing substrate 22 can be seen in FIG. 1C.

A lens array made from numerous lenses for focusing light on the slots in the display area 20A of the drive substrate 21, is directly integrated into the opposing substrate 22. This configuration is referred to as an on-chip microlens (OCL). Each microlens 24 as seen from above may have for instance, a hexagonal shape. The second alignment mark 25 is formed at the desired position within the display area 20B on the opposing substrate 22. This second alignment mark 25 is formed along the grooves 25b between a plurality of protrusions 25a having a semicircular cross section. Each section of the face has a specified width and these sections together form a cross shape. Each leg of the four lines extending to the center of the cross shape has an oblique side 25c. The protrusion 25a is a transparent piece having a specific refraction index, in other words having the same material (for instance transparent resin) and lens shape (semicircular cross section) as the microlens 24 of the display area 20A. The shape of the protrusion 25a when the alignment mark is seen from above with a microscope (FIG. 20) should clearly show the grooves 25a between the adjacent protrusions. This means the protrusions do not necessarily have to be a semicircular shape as long as they stand out sufficiently when seen with a microscope.

In other words, this alignment mark 25 is formed in one process along with the microlenses 24 for the display area 20A, in a method in which forming of the second alignment mark 25 does not require additional steps to the conventional process. This method also allows forming the No. alignment mark 25 so no deviations occur between the microlens 24 and the corresponding position. The liquid crystal display device 20 is characterized in this embodiment by use of the microlens 24 and a simultaneously formed alignment mark 24 for position alignment with the drive substrate 21. In other words, when observing light reflection from the second alignment mark 25 with a microscope as related before, the lens shape which is the protrusion 25a of the second alignment mark 25 will appear distorted due to this lens effect, but the grooves 25b between the protrusions 25a will be expressed with a bold black line A as shown in FIG. 1A. The second alignment mark 25 has these bold black lines A (for groove 25b). The opposing substrate 22 (not shown in drawing) is comprised of a black matrix or color filter to block light as needed.

The drive substrate 21 on the other hand, has slots 23 for showing the image and a TFT (not shown) for controlling pixels within the display area 20A. On the non-display area 20B, the cross-shaped first alignment mark 26 is provided to correspond to the second alignment mark 25 of the drive board 21. The first alignment mark 26 is formed in the same process as the production process for the drive substrate 21 when forming the metal layer 27 of aluminum (Al) or titanium (Ti) for the wiring material and light blocking material. The size and line width of the second alignment mark 26 may vary according to the alignment mark shape.

Figure 2:
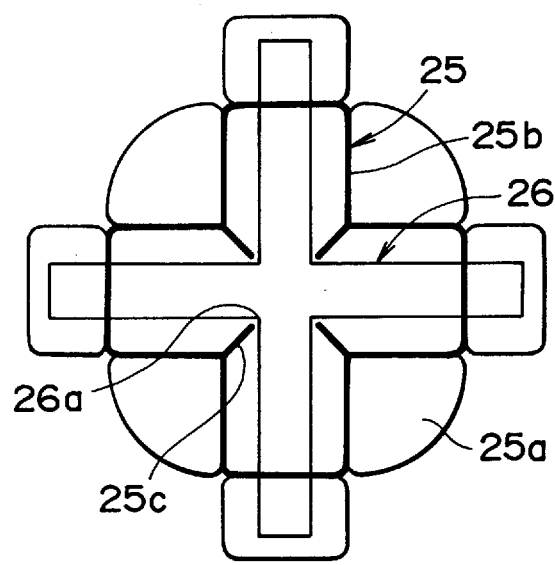
FIG. 2 is an enlarged upper view showing the overlapped state of the first alignment mark and the second alignment marks shown in FIGS. 1A to 1C.
Figure 20:
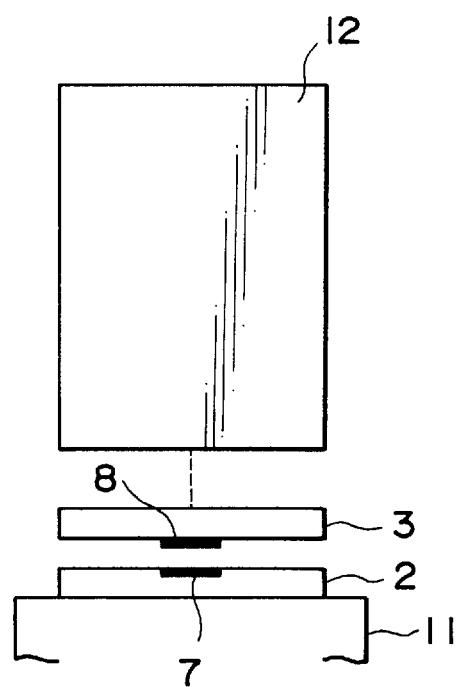
FIG. 20 is concept view of the overlap alignment device.

The drive substrate 21 and the opposing substrate 22 configured as above are overlap-aligned on each other using the first alignment mark 26 and the second alignment mark 25 as references in the same manner as shown in FIG. 20. More specifically, the first alignment mark 26 and the second alignment mark 25 shown enlarged in FIG. 2, are overlap-aligned with each other, and adjustments are performed so that the bold line A (groove 25b) occurring when viewing the reflected light from the protrusions 25a comprising the alignment mark 25, and the gaps of the first alignment mark 26 are each equal in the four directions of up, down, left and right. In the first alignment mark 25 at this time, four oblique lines 25c are provided each facing towards the center so that positioning is accomplished when each of the oblique lines 25c faces one of the four angles 26a of the center of the first alignment mark 26, thus allowing easy positioning of the two substrates.

Results of this overlap-alignment positioning of the first alignment mark 26 and the second alignment mark 25 on the drive substrate 21 and the opposing substrate 22 are as shown in FIG. 1C where a plurality of microlenses 24 are each accurately aligned with the corresponding slots 23.

In the configuration of this embodiment, the second alignment mark 25 of the opposing substrate 22 is formed in the same process as microlenses 24 on the display area 20A so that the second alignment mark 25 can be formed without adding further steps to the conventional process and the forming will cause no deviations between the microlenses 24 and the corresponding position. The overlap-alignment of the drive substrate 21 and the opposing substrate 22 can therefore be performed with good accuracy.

Figure 3:
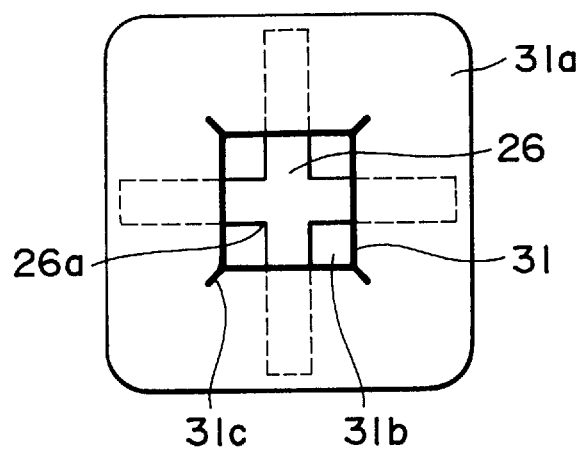
FIG. 3 is an upper view of a variation of the first alignment mark of the embodiment configuration shown in FIGS. 1A to 1C.
Figure 4:
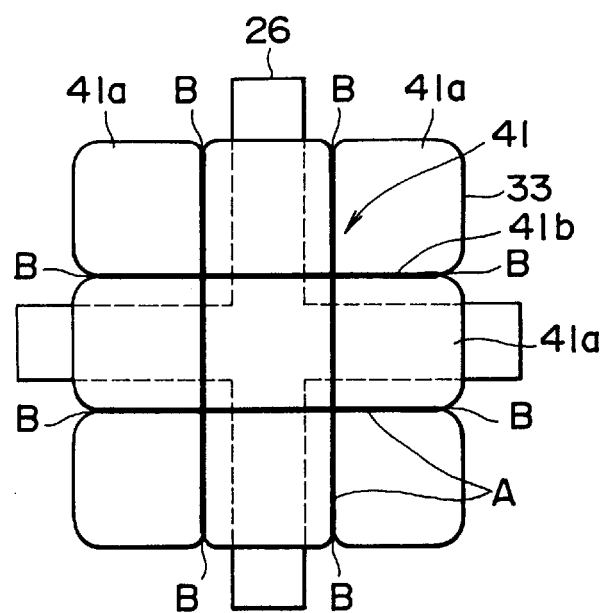
FIG. 4 is an upper view of a variation of the second alignment mark of the embodiment configuration shown in FIGS. 1A to 1C.

Variations on the shape of the second alignment mark for the opposing substrate 22 in the above described embodiment are shown in FIG. 3 and 4. The two marks are shown overlaid on one another as seen from above. The first alignment mark 26 shown here is identical to that in the embodiment.

The flat shape of the alignment mark 31 shown in FIG. 3 is a square along the edges of the slots 31b and forming a quadrangular figure at the center of the protrusion 31a. This square has four oblique lines 31c that come out from the center of each angle like a ray. This second alignment mark 31 of opposing substrate 22 is overlaid on the first alignment mark 26 of the drive substrate 21 and the position of the first alignment mark 26 is adjusted by observing the slot 31b formed at the center of the protrusion 31a so that first alignment mark 26 is at the center of the slot 31b thus allowing the two substrates to be overlapped on each other. By at this time, positioning phantom lines connecting each of the oblique lines 31c at positions corresponding to the second alignment mark 31, by making the angles 26a of the first alignment mark 26 and the center positions overlap, will allow easy overlap-positioning of the two substrates.

The second alignment mark 41 shown in FIG. 4 is comprised of bold black lines A (grooves 41b) between the nine protrusions 41a set in a square pattern adjacent to one another and forms a crosshatch figure. This second alignment mark 41 is overlaid on the first alignment mark 26, and the bold black lines A in the grooves 41b of the second alignment mark 41 have a total of eight edges B which are each adjusted to have a uniform gap with the first alignment mark 26. The drive substrate 21 and the opposing substrate 22 can therefore be overlap-aligned with each other.

The second alignment mark utilizing a lens (protrusion) the same as microlens 24 on the display area 20A, has a bold black line for visual recognition purposes at the groove between protrusions or the edge of the slot. However when attempting to observe with a microscope, the first alignment mark 26 of drive substrate 21 past the opposing substrate 22, the microlens periphery may be difficult to observe visually because of the lens characteristics. Preferably this second alignment mark should be formed so it is directly above the first alignment mark, or so that the microlens comes close to the first alignment mark. This will improve visual recognition accuracy of the second alignment mark.

Figure 5A:
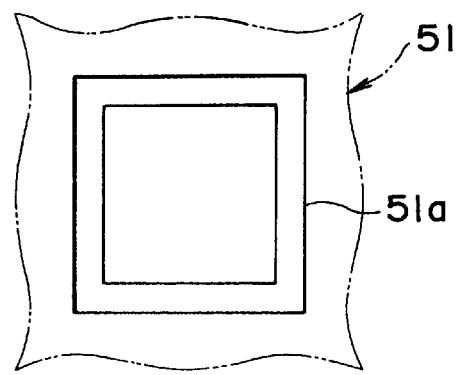
FIGS. 5A and 5B is two figures illustrating the method for forming the second alignment mark of the configuration in the embodiment shown in FIGS. 1A to 1C.
Figure 5B:
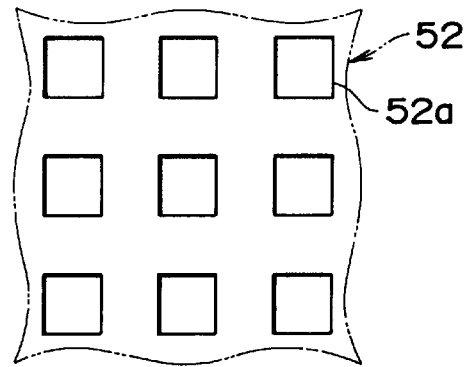

Next, one example of a method for forming various types of lens shaped protrusions for second alignment mark is explained while referring to FIGS. 5A and 5B. This figure is a top view of the master pattern drawing utilized in forming the protrusions. FIG. 5A shows the pattern used in the second alignment mark 31 of FIG. 3. FIG. 5B shows the pattern used in the second alignment mark 41 of FIG. 4.

In other words, a resist pattern is fabricated utilizing the masks 51 and 52 having the slots 51a and 52a as shown in FIGS. 5A and 5B. The base material (for instance glass substrate) as the mask, of the resist patterns are selectively etched (hereafter just "etched") and the hollow of the lens shape (semi-spherical) is formed. This etching can be performed for instance with chlorine gas ($Cl_2$) and helium gas (He) in a dry etching process etc. Next, base material (glass) and light-sensitive resins of varying refraction indexes are filled in the hollow of the lens shape, hardened, and the lens (in other words protrusion) is fabricated. Though not shown in the drawings, the microlens for the pixels are formed at the same time in a similar process at a position corresponding to the slots on the drive substrate. In this process, a lens (protrusion) of the desired shape is produced by optimal temperatures in the heat treatment process and the melting of the lens material.

The surface for forming the microlens and the second alignment mark is the interior or surface of the opposing substrate. The gap between the pattern surface on the drive board and the opposing substrate is from several to several hundred microns. Therefore, it is necessary to contrive a method utilizing a multiple focus point optical system that delivers extremely accurate positioning at points on both ends of this gap. Also needless to say is that the optical system light axis for the multiple focus points must provide extremely precise position matching. The method for forming the microlens and the second alignment mark can be any suitable etching method such as the ion exchange method, or machining methods, and this invention is not limited to the above mentioned methods. Also, the protrusion comprising the bold black line A for the second alignment mark need not always be formed in a lens (semi-spherical) shape by the machining method, and can be fabricated in an process identical to that used for the microlens in the display area.

In the above embodiment for the liquid crystal display device 20, the opposing substrate integrated with the microlens array and the drive substrate were overlap-aligned on each other with good accuracy by means of a structure for the opposing substrate 22 in which the second alignment mark utilizes a bold black line consisting of grooves between protrusions or of slots, fabricated in a process identical to that for the microlens of the display area. However, the accuracy of this overlap-aligning can be further improved by utilizing the method described next.

In the configuration of the above embodiment, the second alignment mark of the opposing board 22 has a shape of specific width (surface area) utilizing bold boundary (grooves) lines between the adjacent protrusions. However these protrusions vary in size due to the manufacturing process. Variations in the protrusion size alone are not sufficient to change the relative positions of these boundary lines. However as for instance, shown in the examples in FIG. 1 and FIG. 2, when the first alignment mark 26 of drive substrate 21, must be viewed through the second alignment mark 25 formed on the opposing substrate 22, poor visual recognition may lower the overlap positioning accuracy. This is explained more specifically as follows.

Figure 8A:
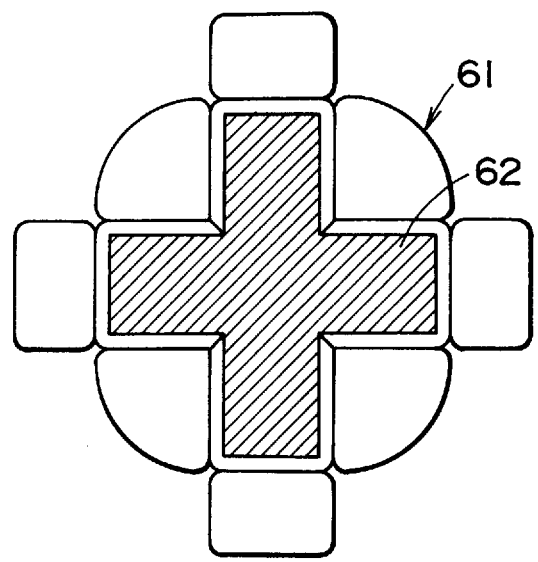
FIGS. 8A and 8B is an upper view of the ideal state when the second alignment mark of FIG. 6 and the first alignment mark of FIGS. 7A and 7B are overlap aligned on each other.
Figure 8B:
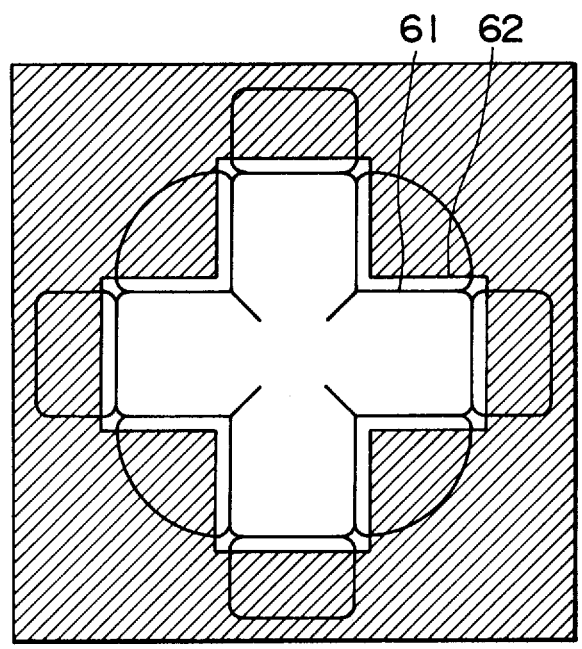
Figure 9:
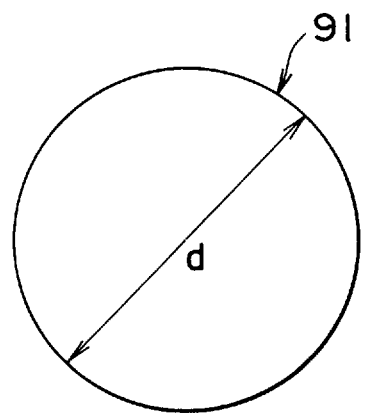
FIG. 9 is an upper view showing samples of other second alignment mark structures and illustrating problems when variations occur in the contour of the protrusions comprising the second alignment mark.
Figure 10:
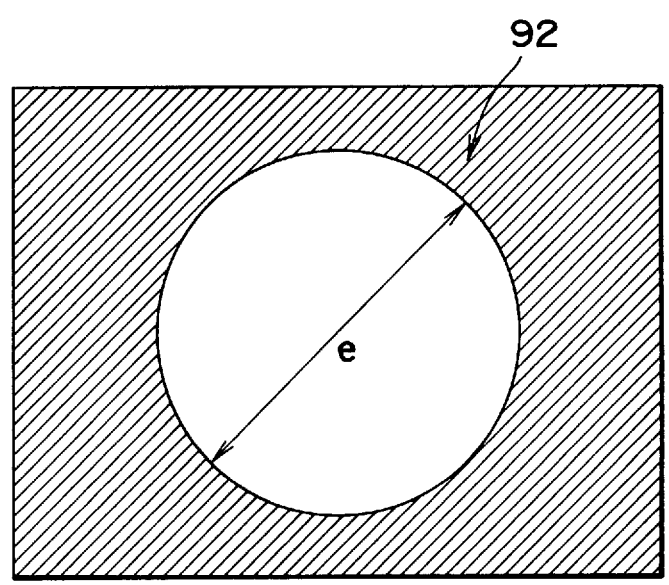
FIG. 10 is an upper view of the structure of the first alignment mark corresponding to the second alignment mark shown in FIG. 9.
Figure 11:
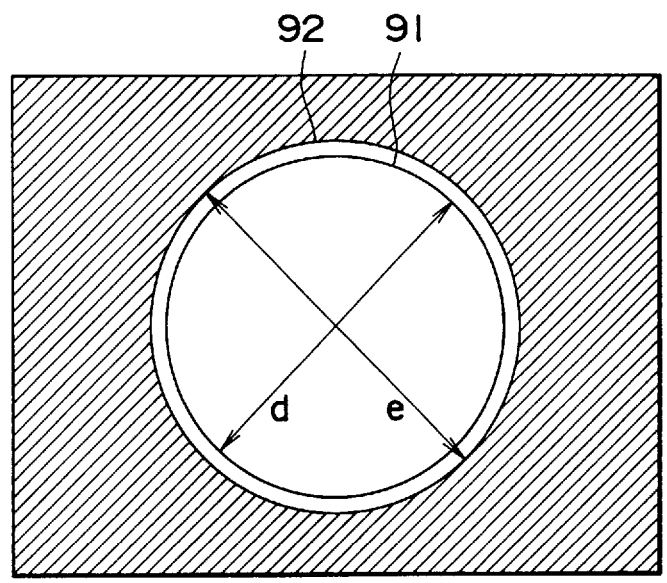
FIG. 11 is an upper view of the ideal state when the first alignment mark of FIG. 9 and the first alignment mark of FIG. 10 are overlap aligned on each other.
Figure 12:
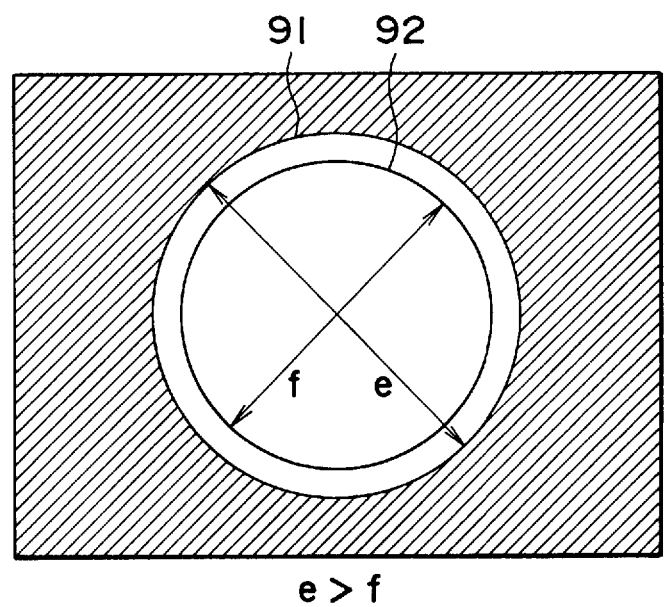
FIG. 12 is an upper view of the overlap aligned state when the contour of the second alignment mark of FIG. 9 has become small.

FIG. 6 shows a second alignment mark 61 of the opposing substrate with an integrated microlens structure the same as that shown in FIG. 1. FIG. 7A shows the first alignment mark 62A of the drive substrate while FIG. 7B shows the same first alignment mark 62B. Here, FIG. 7A shows results when the size of the first alignment mark 61 has varied, and when the width b of each part of the cross shape of the first alignment mark 62A has become narrower than the width a between the boundary lines of second alignment mark 61 in FIG. 6. FIG. 7B shows results when the width c of the first alignment mark 62B has become wider than the width a between the boundary lines A of the second alignment mark 61 of FIG. 6. FIGS. 8A and 8B respectively show an ideal view of the overlap of the second alignment mark 61, with the first alignment marks 62A and 62B of FIGS. 7A and 7B. Ideally, an alignment deviation accuracy between both marks of $\pm(a-b)/2$ in the case of FIG. 8A and of $\pm(c-a)/2$ in the case of FIG. 8B should be obtained. In fact however, when variations in the size of the protrusion contour occur, the alignment shown in the figures does not appear. Another example of the second alignment mark on the opposing substrate is shown in FIG. 9. This second alignment mark 91 utilizes a protrusion with a round contour (dia.θ=d). FIG. 10 shows a corresponding example of first alignment mark 92 (dia.θ=e>d) on the drive substrate. An ideal view of the No. alignment mark 92 and the second alignment mark 91 when overlapped utilizing this type of protrusion is shown in FIG. 11. Ideally, an alignment deviation accuracy between both marks of $\pm(e-d)/2$ is provided, however in actual use this accuracy cannot be obtained. In other words, when the contour of the protrusion gets large (when e<d), visual recognition accuracy becomes poor as shown in FIGS. 6 through 8. However, when the protrusion contour is small (f<e) as shown in FIG. 12, the visual recognition accuracy is good but, the deviation accuracy of the overlap becomes ±(e−f)/2 and accuracy becomes poor. In any of the above cases the overlap accuracy of the above type alignment marks having a fixed surface area will worsen when the contour of the protrusion changes, and the microlens efficiency will also decrease.

An alignment mark configured to match such variations in the protrusions is explained next. This configuration of the embodiment utilizes the boundary lines between protrusions to form the second alignment mark just as in the previously described embodiment however in this version of the embodiment, the flat shaped sections of the first alignment mark and the second alignment mark are made to be linear as explained next.

Figure 14A:
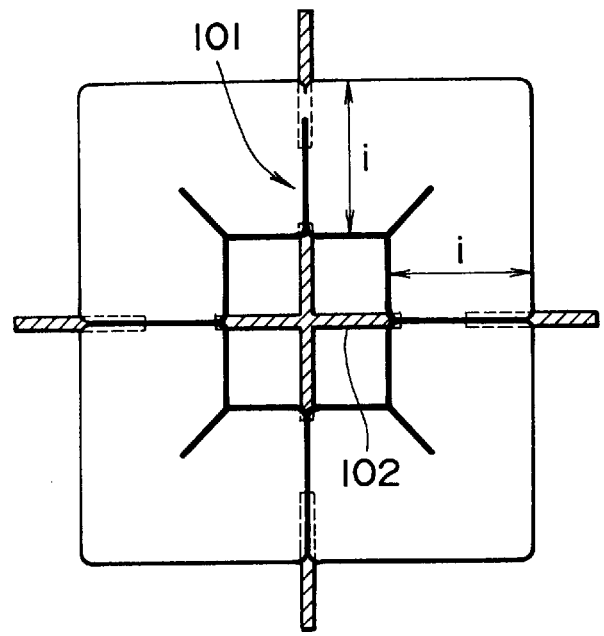
FIG. 14A is an upper view showing an example of a second alignment mark with a contour that has become large.
Figure 14B:
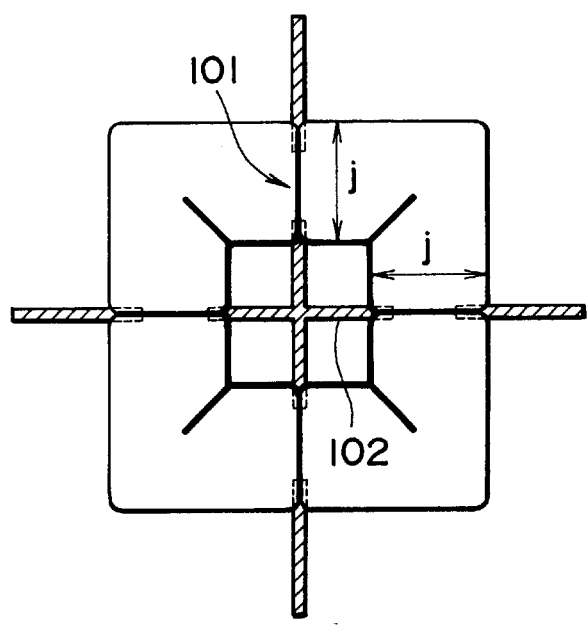
FIG. 14B is an upper view showing an example of a second alignment mark with a contour that has become small.

FIG. 13A shows the second alignment mark 101 of the opposing substrate integrated with the microlens array. FIG. 13B shows the first alignment mark 102 of the drive substrate. The second alignment mark 101 is comprised of the grooves 101b between four adjacent protrusions 101a placed in mutual symmetrical positions, so that the four lines (groove 101b) are positioned in roughly a cross shape. A slot 101c with a square shape for visual recognition of the first alignment mark is located at the center of the four protrusions 101a. The edge of this slot 101c also comprises the second alignment mark 102. The first alignment mark 102 on the other hand, is made up of; the four line sections 102a (width h) corresponding to the four grooves 101b that comprise the second alignment mark 101, and the four line sections 102a which correspond to the slots 101c for the second alignment mark 101 and also comprise the cross shape 102b. Therefore when overlap aligning the drive substrate and opposing substrate in the configuration of this embodiment, the cross shape of the second alignment mark 101 must overlap and match the cross shape of the first alignment mark 102 by way of the slot 10c. An ideal view of both marks overlapped is shown in FIG. 13C. Here, even if variations occur in the diameter (g) of protrusion 101b of the second alignment mark 101, the length of g will change, however the position itself will not change, because only the boundaries (grooves 101b) between protrusion 101a of the second alignment mark 101 body are utilized. Also, the first alignment mark 102 of the drive substrate can be viewed by means of the slot 101c by the non-overlap portion with lens shaped protrusion 101a of the drive substrate. Therefore recognition visibility is also improved and the overlap shown in FIGS. 14A and 14B can be obtained. FIG. 14A shows the alignment mark 101 when the diameter of protrusion 101a has increased (g<i) and FIG. 14B shows the alignment mark 101 when the diameter of protrusion 101a has decreased (g>j). A deviation accuracy of ±h/2 for the overlap can be obtained.

Figure 15:
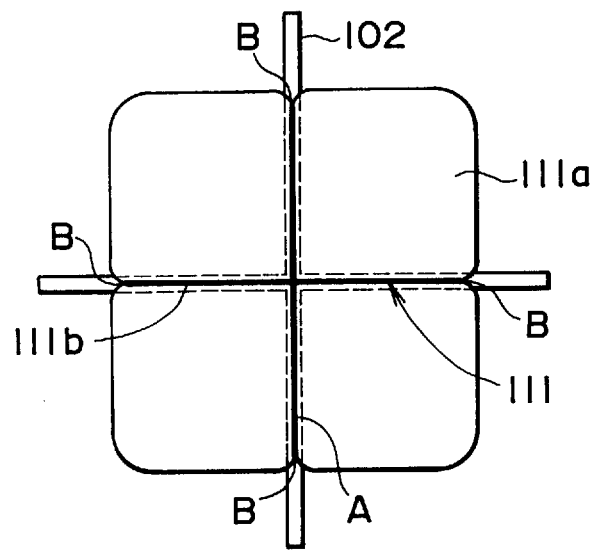
FIG. 15 is an upper view of a variation of the second alignment mark in the embodiment shown in FIGS. 13A to 13C.
Figure 16:
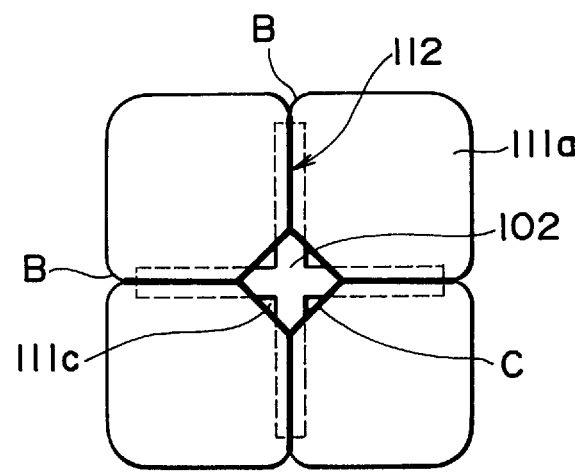
FIG. 16 is an upper view of a variation of the second alignment mark in the embodiment shown in FIGS. 13A to 13C.
Figure 19:
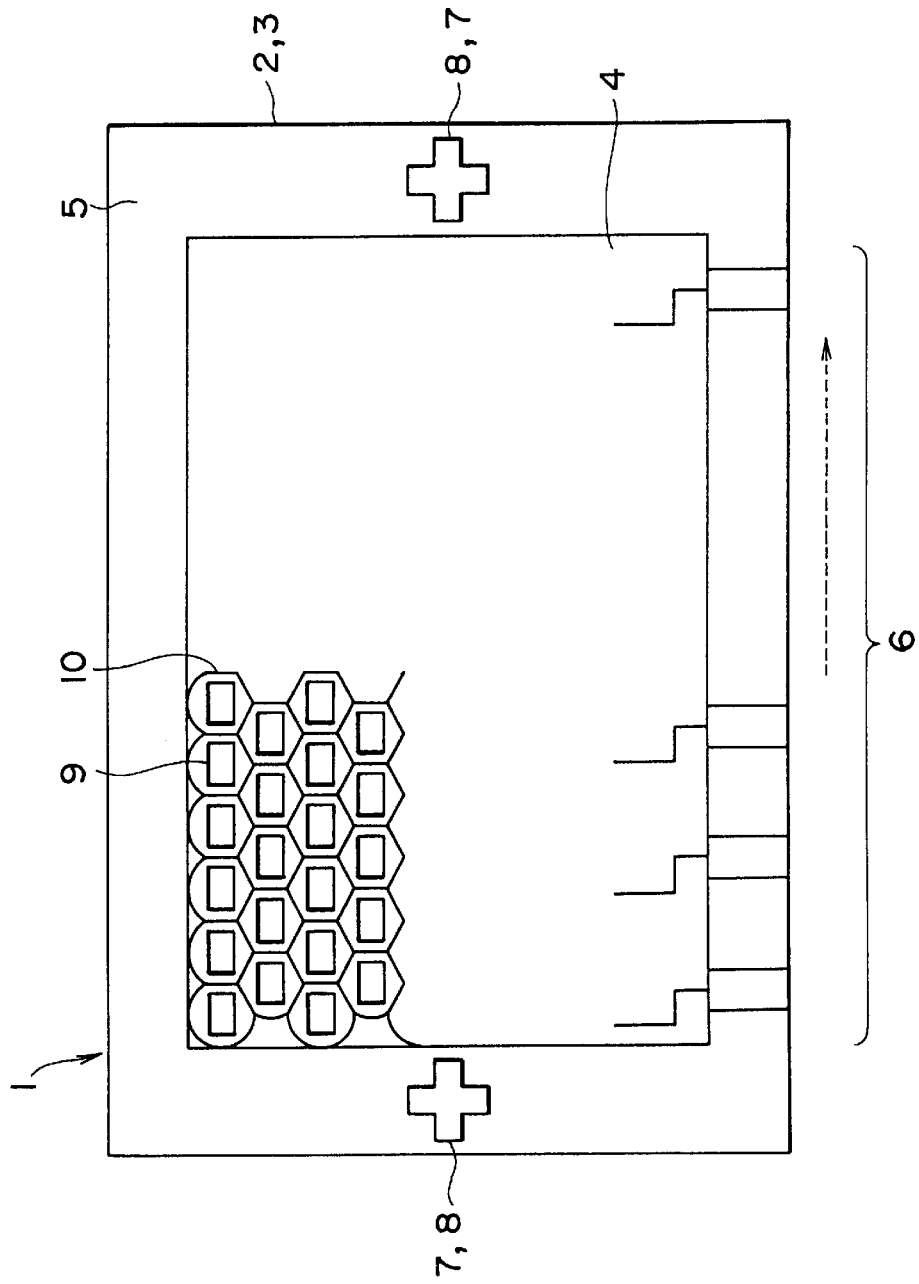
FIG. 19 is an upper view of the overlap alignment of two substrates in the liquid crystal display device of the related art.

FIGS. 15 and 16 respectively show sample variations on the second alignment mark shapes for the opposing substrate 22 relating to the above embodiment. Each of these two marks are shown from the top while overlapped. This is the same configuration as the embodiment for the first alignment mark 102.

The flat shape of the second alignment mark 111 is a cross shape comprising the grooves 111b between the four protrusions 111a placed at symmetrically opposing positions. This alignment mark 111 is overlapped on the first alignment mark 102 and, the edges B at four locations of the four bold black lines A (grooves 111b) on the second alignment mark 23 are adjusted so their positions align with the cross shape of the first alignment mark 102 allowing the two substrates to properly overlap-align with each other.

The example shown in FIG. 16 is provided with an oblique or diamond-shaped slot 111c for visual recognition of the first alignment mark at the center section between the four protrusions 111a shown in FIG. 15. In other words, the second alignment mark 112 utilizes the edges (bold black line C) of this slot 111c to form the oblique sided figure at the center of the cross shape of the second alignment mark 111 shown in FIG. 15. This second alignment mark 112 is overlapped on the first alignment mark 102, and the position of the first alignment mark 102 adjusted by viewing from the slot 111c so that it reaches exactly to the center allowing the two substrates to properly overlap-align with each other.

FIGS. 17A and 17B are respectively top views of the masks 113 and 114 utilized in forming the second alignment marks in FIGS. 15 and 16. FIG. 17A shows the pattern corresponding to the second alignment mark 111 in FIG. 15, and FIG. 17B shows the pattern corresponding to the second alignment mark 112 in FIG. 16. The details of their forming methods are the same as in FIG. 5 so an explanation is omitted here.

The first alignment mark 102 shown in FIG. 13B can be comprised so that the negative and positive sections are reversed as shown in FIG. 18.

In this type of configuration of the embodiment, even if variations occur during the manufacturing process in the size of the lens shaped protrusion making up the alignment mark, there will be no degradation in overlap alignment accuracy. The forming of the alignment mark in the same process as the microlens in the display area and the consequent effects are the same as for the previously mentioned embodiment configurations.

Further, in this configuration of the embodiment, even if the type of liquid crystal panel (namely, the size of the microlens in the display area) changes, the second alignment mark is comprised utilizing the protrusion boundary lines (grooves) the same as this lens so that the alignment device can still be used.

Various configurations of the embodiment have been described for this invention, however this invention is not limited by the above descriptions of the embodiment and may be adaptable in various configurations within the scope of this invention. For instance in the configuration of the above embodiment, the second alignment mark was a cross shape, however other shapes may be used provided the shape utilizes protrusions made in the same process as the microlens. Also, in the above embodiment, an example was described, after first integrating the microlens into the opposing substrate, for overlapping the drive substrate and the opposing substrate by utilizing the alignment marks, however another method may be used in which after overlapping the drive substrate and a transparent substrate serving as the opposing substrate, another substrate formed with the microlens in a separate process, is used for overlap alignment of the substrates by means of the previously described alignment marks. The overlap alignment of the two substrates can be performed visually in a manual process, or the alignment performed automatically utilizing a visual recognition sensor. Either of these methods is applicable to this invention.

What is claimed is:

1. A liquid crystal display device comprising: a first substrate having a first alignment mark formed in a non-display area, and a display area including a pixel section comprised of a plurality of pixels; and a second substrate having a lens array comprised of micro focus lenses corresponding to said pixel section, and a second alignment mark comprised of transparent material identical to the material for said micro focus lenses, and placed at a specified gap opposite said first substrate.

2. A liquid crystal display device of claim 1 wherein said second alignment mark, has one or more protrusions formed along with said micro focus lenses, on the surface of the second substrate.

3. A liquid crystal display device of claim 2 wherein said second alignment mark has a contour formed along the groove between the adjoining protrusions or along the edges of the protrusions on the surface of said second substrate.

4. A liquid crystal display device of claim 3 wherein the first alignment mark has a flat cross shaped contour, and the cross shaped contour of said second alignment mark has sections of specific widths along said grooves.

5. A liquid crystal display device of claim 3 wherein the flat shape of said first alignment mark has a cross shaped contour, the flat shaped second alignment mark is formed along the edges of a plurality of protrusions, and formed in a quadrangle to correspond to an area including the center and vicinity of the first alignment mark.

6. A liquid crystal display device of claim 4 wherein the flat shape of said second alignment mark has oblique lines whose lines extend towards the center of the four corners of the cross shape.

7. A liquid crystal display device of claim 5 characterized in that the flat shape of said second alignment mark has oblique lines whose phantom lines are directed towards the center of the four corners of the cross shape.

8. A liquid crystal display device of claim 3 wherein the flat shape of said first alignment mark has a cross shape at each section and the second alignment mark is formed in a cross shape made up of lines at each section by means of grooves between four protrusions placed at adjacent and mutually symmetrical positions at that flat shape.

9. A liquid crystal display device of claim 8 wherein slots are present at the center between the four protrusions, for direct viewing of the first alignment mark.

10. A liquid crystal display device of claim 9 wherein the slots are square or rhomboid type.

11. A liquid crystal display device of claim 1 wherein the first alignment mark and the second alignment mark are respectively provided in at least two locations in the non-display area of the first and second substrates.

* * * * *